Dec. 23, 1969    H. VAN SCHAACK    3,485,932
COLUMNAR CABINET FOR ACCESS LOOPS OF BURIED CABLE
Filed Sept. 9, 1968    2 Sheets-Sheet 1
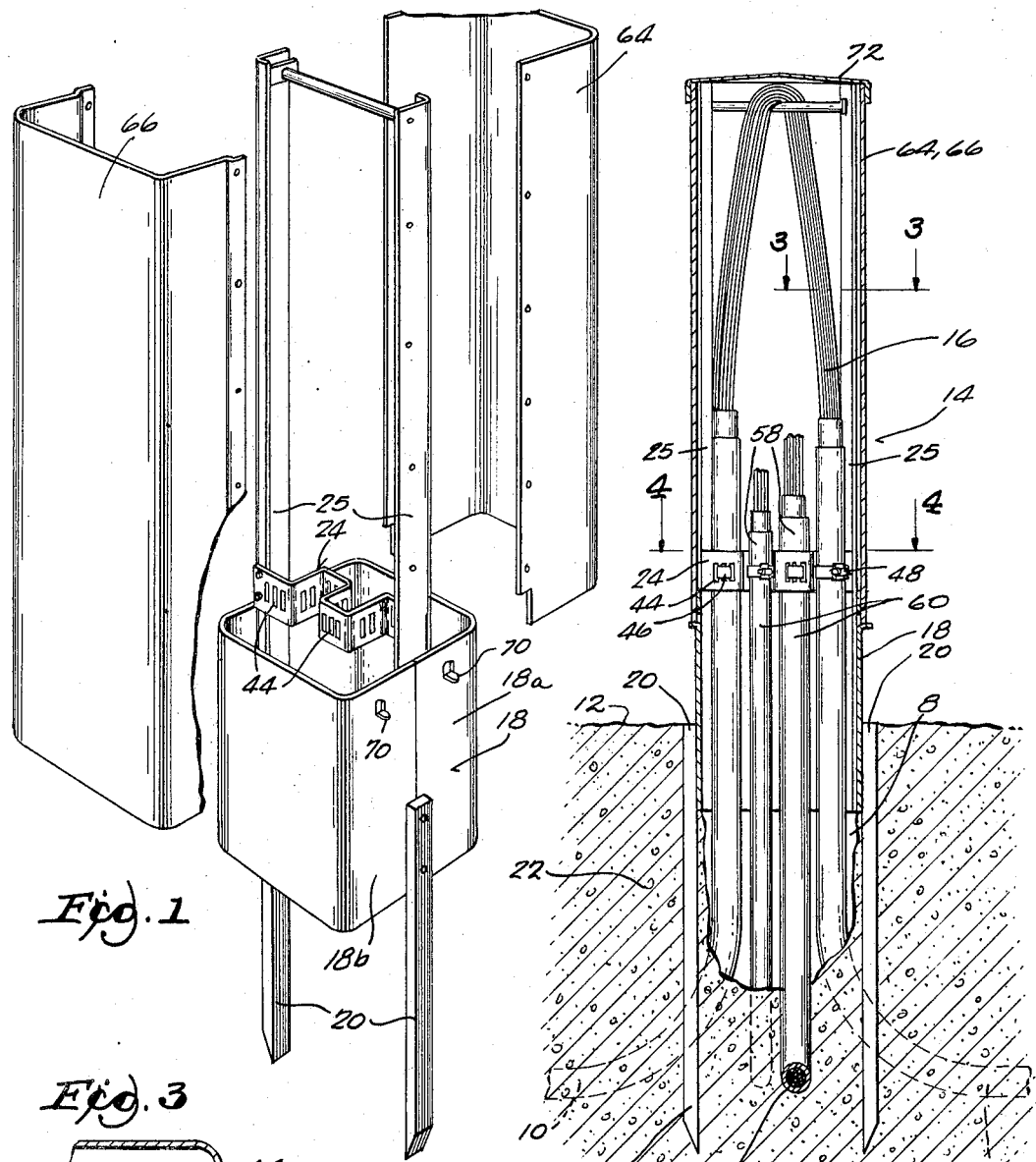
Fig. 1
Fig. 2
Fig. 3
Fig. 6
INVENTOR
HARDING VAN SCHAACK
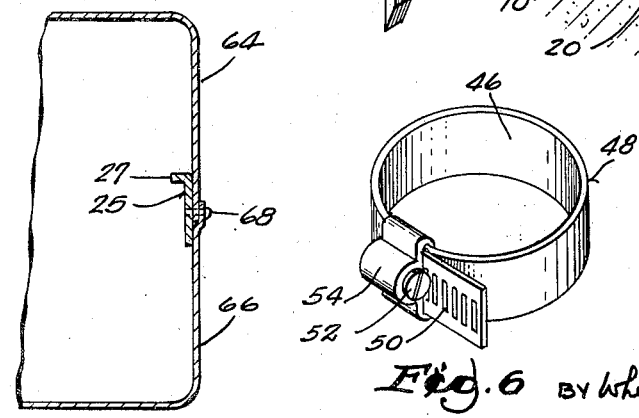
ATTORNEYS

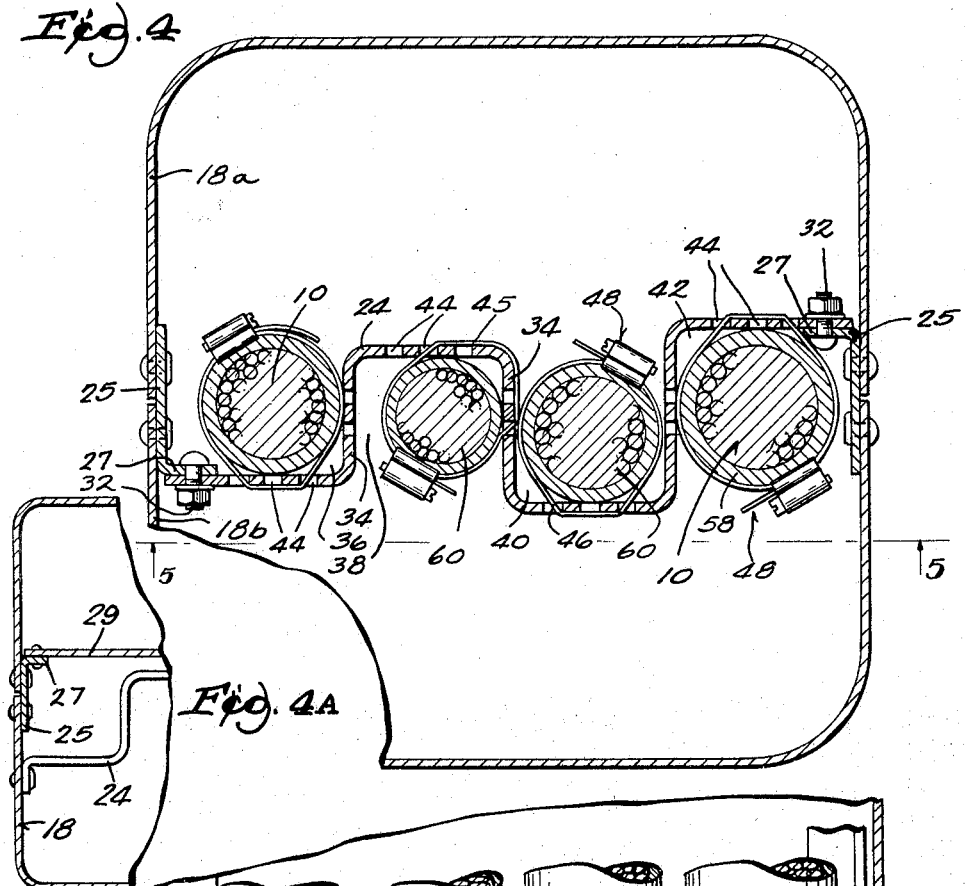
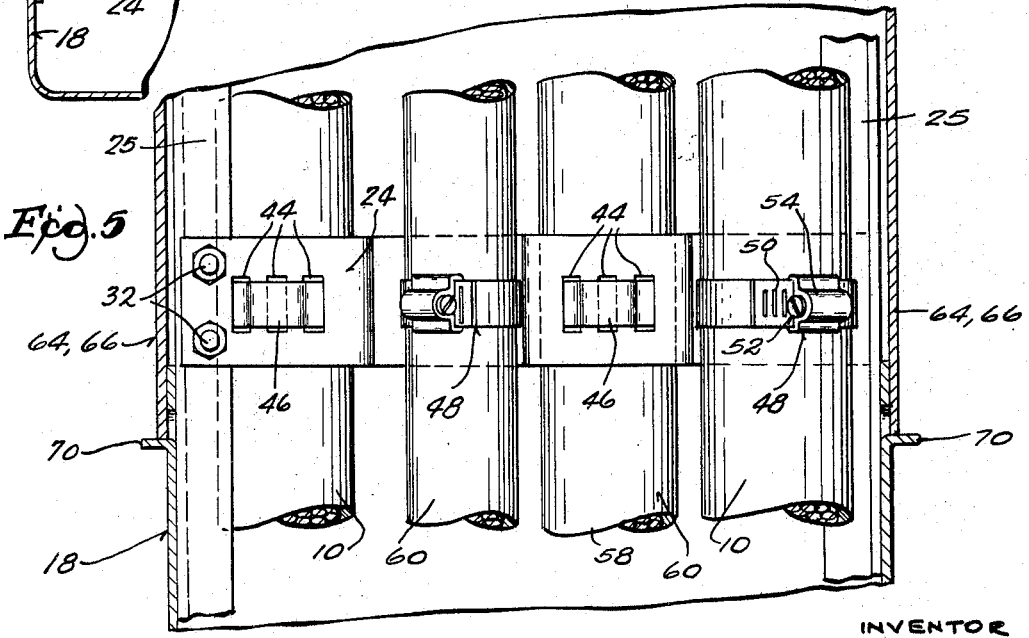

United States Patent Office 3,485,932
Patented Dec. 23, 1969

3,485,932
COLUMNAR CABINET FOR ACCESS LOOPS OF BURIED CABLE
Harding Van Schaack, 2460 Pasadena Blvd., Wauwatosa, Wis. 53226
Filed Sept. 9, 1968 Ser. No. 758,533
Int. Cl. H02g 9/02
U.S. Cl. 174—38                              11 Claims

ABSTRACT OF THE DISCLOSURE

A hollow column with removable sides is mounted on a base usually straddling a cable trench and anchored on legs extending into the earth. A buried cable or cables have loops extending above ground level in the column, these being supported by screw-tightened grounding clamps respectively fixed in convolutions of a horizontal rigid support bracket or strap extending across from column to column substantially but not necessarily in its vertical central plane, whereby maximum accessibility to the cables and the individual circuit wires is afforded with minimum wasted inside area being required by the support bracket.

BACKGROUND OF THE INVENTION

The industry has been searching for many years for an organization such that telephone and other cables can be buried and still have all circuits fully accessible at desired aboveground ready access points. Many patents and many commercial structures have columns for housing loops of such cables but none has been entirely satisfactory in providing (a) adequate support and still permitting full accessibility, (b) a removable closure that has a minimum of size for residential and high-class garden-type commercial buildings. A survey discloses such art as U.S. Patents to McLeod 477,218; Potruch 3,173,987; Fitzpatrick 2,179,406; Fletcher 3,180,920 and Hamilton 2,916,539; and French Patent 1,271,543.

To be acceptable, the columnar cabinet in which the cables loops are housed should be of minimum dimensions and should provide full support for the loops when the earth under and about the cables settles; the supporting and positioning means should locate the cables centrally and securely while affording maximum accessibility on both sides for splicing, terminating or loading of wires of the various circuits, singly or collectively.

SUMMARY OF THE INVENTION

The foregoing and other objects are achieved by providing a columnar cabinet having a base portion to which legs are fixed in metallic contact so as to be at the same electrical potential and through which base the cable loops rise to a level at which any wire portions stripped of insulation will be protected against damage from floods or otherwise.

Connected detachably to the legs and base are removable cabinet wall sections housing the cable loops. These loops are mounted securely by clamps on the order of hose clamps, these being fixed to a centrally disposed and generally horizontal support bar spaninng the cabinet, and having convolutions which provide cable-locating pockets that open alternately in opposite directions and each of which is adapted to receive one or more cables and clamps therefor. The clamps have screws disposed obliquely for ready access when the respective wall sections are detached. The clamps effectively ground the metallic cable sheath. The cable loops may be very heavy and may impose considerable loads on the supporting and grounding clamps and the convoluted bar. In passing through vertically elongated slots with which the bar is provided in its respective convolutions, the clamps provide secure anchorage against sagging of the loops if the ground settles under the buried portions of the cables.

In the completed installation, the several cables are substantially aligned with each other in the transverse central plane of the cabinet whether the individual pockets open at one or both sides of the bar. The construction makes the bar as rigid as the channels sometimes used heretofore. Yet a much greater area of the cabinet is left open for unimpeded access to the cables or circuits, or conversely permitting a reduction of about 1⅝ inches in either the cabinet width or depth (front to back).

DESCRIPTION OF THE DRAWINGS

FIG. 1 is a view in perspective showing a columnar cabinet embodying the invention.

FIG. 2 is a view of the cabinet in front elevation with its front wall broken away.

FIG. 3 is a view in section on line 3—3 of FIG. 2.

FIG. 4 is a view in section on a greatly enlarged scale on line 4—4 of FIG. 2.

FIG. 4a shows fragmentarily a slight modification of FIG. 4.

FIG. 5 is a view in section on line 5—5 of FIG. 4.

FIG. 6 is a detail view in perspective of a preferred cable clamp.

DESCRIPTION OF THE PREFERRED EMBODIMENT

A trench 8 carries feeder cable 10 well below ground level 12. Disposed over the trench is a cabinet 14 embodying this invention and into which is extended for ready access purposes a loop 16 of distribution or freeder cable 10.

Cabinet 14 comprises a base 18 to which are fixed one or more upright supports such as legs 20 extending securely into the earth 22 usually (but not necessarily) at opposite sides of the floor of trench 8. The base desirably comprises sections 18a and 18b fixed in unitary connection by welding or by rivets or bolts to the legs 20.

Near the top margins of the base sections 18a and 18b or more generally a few inches above same, the base is spanned by a cable-aligning, grounding and anchorage bar 24, which is substantially centered on the mid-vertical plane of the rectangular cross section of the cabinet. The bar is connected to opposite sides of the base, or to an adjacent portion of the column section. Fasteners such as rivets, screws or bolts 32 may be used or, in some cases, the bar 24 may be welded in place.

In the contruction shown in FIG. 4, the columns 25 have their flanges 27 arranged for connection of opposite ends of the cable anchorage bar 24. These columns are not necessarily in direct mechanical connection with the legs, but they receive support therefrom and may, for some purposes, be regarded as being, in effect, upward extensions of the legs 20. There are so many different ways in which the cabinet may be constructed that I do not wish to limit myself to any particular bar mounting.

As an alternative arrangement, FIG. 4a shows that the bar may be attached directly to the cabinet base 18. This may be particularly desirable when the column flanges 27 are disposed in a common plane as is sometimes done, for example, for the mounting of a panel 29. Such a panel is frequently used when telephone loading coil cases or terminating circuits are to be mounted in one-half of the cabinet and power or television circuits in the other half of the cabinet. Panel 29 may be bare steel, overall insulated (dip process) steel, or ¾ or ⅞" exterior or marine plywood.

The convoluted mounting bar 24 is so versatile in its application and usage as to be adaptable to almost any conventional practice. It is broadly immaterial whether it is attached to the base, or to the columns or some equivalent structure, or to one of the half bases and to one of the uprights 25. Whatever the part to which the bar 24 is connected, the bar ultimately receives support from the ground and serves to support and anchor the cables securely and provide electrical grounding continuity from the metallic cable sheath to the hose clamp to the bar 24 to the columns, or to the base, to the stakes, and ultimately to the earth.

Although the bar 24 is preferably made of strap-like material, it is very strong, having substantial width in a vertical plane and being provided with convolutions 34 which define pockets opening alternately at opposite sides thereof as shown at 36, 38, 40 and 42. The end pockets 36 and 42 are slightly larger than the intermediate pockets and are bound in part by a wall surface of the base or column.

At each pocket, the bar has upright slots 44 in which are threaded the bights of straps 46 of clamps 48, which are of a type commonly used as hose clamps. These are preferably made of stainless steel. Preferably there are two or three slots in the bar at the back of each pocket plus a slot or slots at sides of pockets (FIG. 4). This facilitates location of the strap 46 of the clamp to fix a cable loop in a desired location according to its size (or other requirement). A strap may be cornered across an angle of the convoluted bar as at 45 (FIG. 4) to confine a cable loop in the corner between two adjacent surfaces at right angles to each other. Each clamp strap 46 has at one free end cross slots 50 which serve as threads engaged by the worm-like thread of a screw 52, rotatable in the barrel 54 connected to the other free end of the strap of the clamp. It will be noted in FIG. 4 that in each case the barrel is obliquely disposed so that the screw is directed out of the pocket and the space taken by the barrel 54 does not detract from the space available for the cable. Thus, its end is readily accessible whether at one side of bar 24 or the other. Each clamp is tightened onto the grounding metal sheath 58 of the cable which is positioned in the respective pockets. This not only anchors the cable but also grounds the sheath thereof. In the disclosed organization, the clamp cannot sag and therefore remains undamaged and serviceable so that it may readily be released or refastened as desired.

It will be noted that the cable anchorage is versatile. The cable loop 16 has portions of cable 10 in each of larger pockets 36 and 42. In FIG. 4, a distribution cable 60 is shown in pocket 38 and a stub-out cable in pocket 40. It will be apparent that more than one cable of small cross section may be clamped into a single pocket.

Because the material of bar 24 is strap-like, normally requiring no flanges (by reason of its convolutions) and because all cables are in one plane, or substantially so, maximum clearance is left for manipulation, terminating, loading, and/or splicing. Yet all wires are freely accessible from both sides when the closure elements 64 and 66 of the cabinet 14 are removed. The over-all dimensions of the bar, front to rear and vertically, are substantially determined by the size of cables to be supported and the span between its means of support at its ends.

Normally the loops and splices are enclosed by side closure elements 64 and 66 which are detachably connected to each other and to uprights 25 by readily releasable connectors such as stainless steel screws or bolts 68. Lips 70 on the base provide support and the top closure 72 completes the cabinet and excludes the weather by telescoping on the outside of the covers.

I claim:

1. A columnar cabinet provided with generally upright supporting means and comprising an enclosure for upwardly extending access loops of buried cable, a mounting bar extending across the cabinet and provided with means for connecting its ends to receive support from said supporting means, said bar having convolutions forming cable positioning pockets opening alternately on opposite sides of the bar, and means connected with the bar for anchoring cable loop portions in the pockets.

2. A cabinet according to claim 1 which includes a base structure, the upright supporting means comprising spaced columns, and the bar extending transversely across the space between said columns, the cabinet including side sections with opposing walls removably attached to said columns and enclosing said bar and cable loop portions disposed in the respective pockets.

3. A cabinet according to claim 2 in which certain of said convolutions provide pockets of a cross section adapted to receive a single cable and another has means for positioning and grounding a plurality of cable portions in a single pocket.

4. A cabinet according to claim 1 in which said bar convolutions constitute means for holding substantially in one plane transversely of the cabinet and between said supports, the said loops anchored in respective pockets.

5. A cabinet according to claim 4 in which said plane is approximately midway between the opposing walls of the removable side sections.

6. A cabinet according to claim 1 in which the mounting bar comprises a metal strip of substantial height and the convolutions thereof form pockets having a cross section substantially determined by the sizes of cable loop portions to be positioned therein.

7. A cabinet according to claim 6 in which the cables have metallic sheaths desirably grounded and the mounting bar is provided in said convolutions with rectangular slots vertically elongated, each said cable loop anchoring means comprising a strap having a bight portion extending through two such slots and having cable-embracing end portions in the respective pocket, and means for adjustably connecting said end portions and tensioning the strap about the metallic sheath of a cable loop that is in the pocket.

8. A cabinet according to claim 7 in which the certain slots are in contiguous angularly related portions of a convolution, the strap bight portion extending externally about the angle between said portions to draw the sheath of a mounted cable loop into the angle between said convolution portions.

9. A cabinet according to claim 1 in which the supporting means with which the bar ends are connected includes a ground stake to which one end of the bar is attached.

10. A cabinet according to claim 9 in which the supporting means further includes a base section, a column with which the base section is connected, and means for connecting the other end of the bar to the base section in proximity to said column.

11. A cabinet according to claim 1 in which the upright supports comprise spaced stakes adapted to penetrate the earth, a cabinet base structure having opposing side walls and connected with said legs and extending to a level above the surface of the earth and through which a cable loop may extend upwardly above said surface, a mounting bar extending across the base section intermediate the side walls, means for connecting the ends of the bar to receive support from the legs directly or indirectly, the pockets formed by bar convolutions adjacent said connecting means being completed by portions of the base structure or columns, the bar having multiple slots opening into each such pocket, and the respective cable anchoring means comprising clamps having strips with bights extending through pairs of slots, and strap tightening means including a screw and a barrel in which the screw is mounted with its axis obliquely disposed toward the outside of the respective pocket and its barrel essentially outside of the pocket so as not to limit the size of the cable located in said pocket.

References Cited

UNITED STATES PATENTS 3,431,349  3/1969  Hamilton _____ 174—38

LARAMIE E. ASKIN, Primary Examiner

U.S. Cl. X.R.

174—100